(12) United States Patent
Schwarz

(10) Patent No.: US 6,176,911 B1
(45) Date of Patent: Jan. 23, 2001

(54) INK COMPOSITIONS

(75) Inventor: William M. Schwarz, Webster, NY (US)

(73) Assignee: Xerox Corporation, Stamford, CT (US)

( * ) Notice: Under 35 U.S.C. 154(b), the term of this patent shall be extended for 0 days.

(21) Appl. No.: 09/301,296

(22) Filed: Apr. 28, 1999

(51) Int. Cl.$^7$ .................................................... C09D 11/02
(52) U.S. Cl. ..................................... 106/31.43; 106/31.75
(58) Field of Search .............................. 106/31.43, 31.75

(56) References Cited

U.S. PATENT DOCUMENTS

| | | | |
|---|---|---|---|
| 2,589,674 | * 3/1952 | Cook et al. ............................. | 554/52 |
| 3,615,749 | * 10/1971 | Cramer et al. .......................... | 106/10 |
| 4,840,674 | 6/1989 | Schwarz ................................. | 106/22 |
| 4,959,661 | * 9/1990 | Buxton et al. ...................... | 106/31.65 |
| 5,019,166 | 5/1991 | Schwarz ................................. | 106/22 |
| 5,334,435 | 8/1994 | Rossi et al. .......................... | 428/195 |
| 5,378,269 | 1/1995 | Rossi et al. ........................ | 106/22 K |
| 5,403,955 | 4/1995 | Farooq ................................. | 564/15 |
| 5,425,805 | 6/1995 | Botros et al. ...................... | 106/22 H |
| 5,626,654 | 5/1997 | Breton et al. ...................... | 106/31.33 |
| 6,086,661 | * 7/2000 | Malhotra et al. .................. | 106/31.43 |

* cited by examiner

Primary Examiner—Helene Klemanski
(74) Attorney, Agent, or Firm—Judith L. Byorick

(57) ABSTRACT

Disclosed is an ink composition which comprises (1) water; (2) a colorant; and (3) an additive selected from the group consisting of monoalkylamido quaternary ammonium salts and mixtures thereof.

19 Claims, No Drawings

INK COMPOSITIONS

BACKGROUND OF THE INVENTION

The present invention is directed to ink compositions. More specifically, the present invention is directed to compositions suitable for use in ink jet printing processes. One embodiment of the present invention is directed to an ink composition which comprises (1) water; (2) a colorant; and (3) an additive selected from the group consisting of monoalkylamido quaternary ammonium salts and mixtures thereof.

Ink jet printing systems generally are of two types: continuous stream and drop-on-demand. In continuous stream ink jet systems, ink is emitted in a continuous stream under pressure through at least one orifice or noble. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 5,626,654 (Breton et al.), the disclosure of which is totally incorporated herein by reference, discloses an ink composition which comprises an aqueous liquid vehicle, a dye, and a vesicle-forming lipid, wherein vesicles of the lipid are present in the ink. Examples of vesicle-forming lipids include glycerophospholipids, diacylglyceroles, α,ω-dipolar diacetyles, and the like.

U.S. Pat. No. 5,425,805 (Botros et al), the disclosure of which is totally incorporated herein by reference, discloses an ink jet ink composition comprising a liquid vehicle, a dye, and an N-hydroxyalkyl branched polyethyleneimine polymer or an N-hydroxyalkyl diphenylguanidine substituted at about 80% of the available nitrogens. The dye in this ink jet composition decreases the solubility of the ink and, therefore, can be used to formulate waterfast inks for ink jet printers.

U.S. Pat. No. 5,403,955 (Farooq), the disclosure of which is totally incorporated herein by reference, discloses mor dants based upon a polyethyleneimine backbone and either pendant phosphonium or quaternized-nitrogen compounds. The mordants find use in stopping or controlling ink-bleeding into ink-jet receptors and photographic films.

U.S. Pat. No. 5,378,269 (Rossi et al.), the disclosure of which is totally incorporated herein by reference, discloses a recording liquid for ink-jet recording comprising coloring matter, which is an image-forming component, and a liquid medium for dissolving the coloring matter therein. The liquid medium is ethanol and the coloring matter is a dye represented by the following general formula (A):

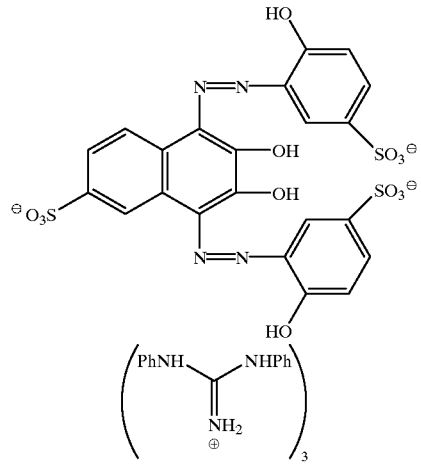

or the following general formula (B):

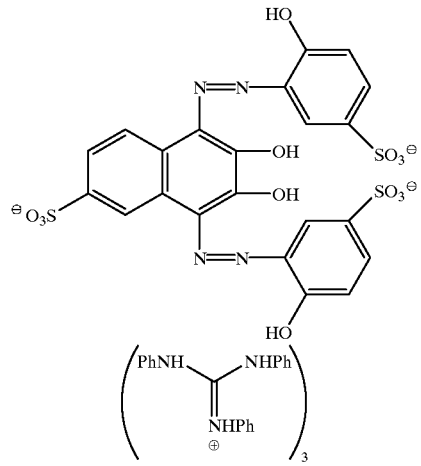

as an image-forming component.

U.S. Pat. No. 5,334,435 (Rossi et al.), the disclosure of which is totally incorporated herein by reference, discloses a recording liquid for ink-jet recording comprising coloring matter, which is an image-forming component, and a liquid medium for dissolving the coloring matter therein. The liquid medium is ethanol and the coloring matter is a dye represented by the following general formula (A):

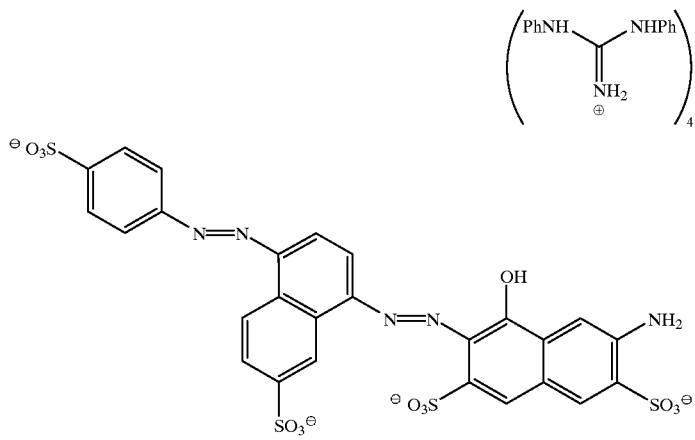

or the following general formula (B):

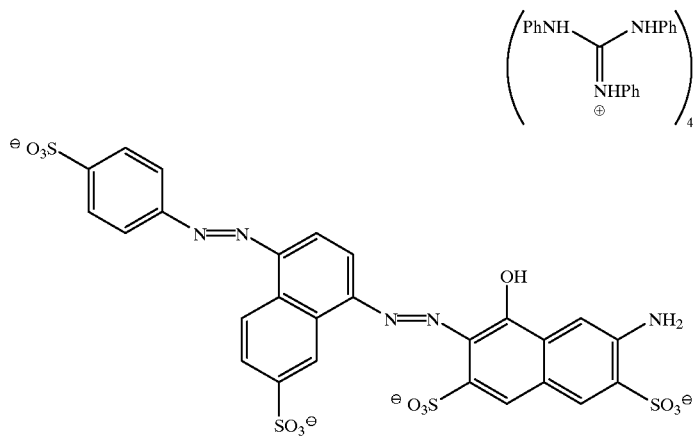

as an image-forming component.

U.S. Pat. No. 4,840,674 (Schwarz), the disclosure of which is totally incorporated herein by reference, discloses an improved ink composition comprising a major amount of water; an organic solvent selected from the group consisting of tetramethylene sulfone; 1,1,3,3-tetramethyl urea; 3-methyl sulfolane; and 1,3-dimethyl-2-imidazolidone; which solvent has permanently dissolved therein spirit soluble dyes such as black, yellow, cyan, magenta, brown, and mixtures thereof. At least one of the specific ink compositions disclosed therein also contains diphenyl guanidinium sulfate.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions to be ejected from a thermal ink jet printer in imagewise fashion onto a substrate.

With respect to issues of image permanence, until recently, little attention has been paid to wet smear. Rather, waterfastness has been the most widely measured criterion of image permanence. While good wet smear characteristics may be found in waterfast inks, waterfastness of an ink does not guarantee that the ink will exhibit good wet smear characteristics. Wet smear is the mechanical displacement of the ink colorant from a receiver sheet (such as paper, transparency, or the like), subsequent to drying of the original image, when the dried image is subjected to contact with a wet object, and primarily reflects how tightly the colorant is bound to the topmost areas of the receiver sheet. Waterfastness is the degree to which water can resolvate and remove the ink colorant from the receiver sheet without mechanical assistance. Binding of the colorant is common to and important for both characteristics. Obtaining good wet smear characteristics, however, is more difficult than obtaining good waterfastness, since wet smear has an additional mechanical component thereto. A friable insoluble surface may exhibit good waterfastness but poor wet smear; accordingly, solving the problem of smear requires stabilization of the image surface, either with or without also improving waterfastness. Obtaining good wet smear characteristics is particularly difficult with yellow inks, and also particularly difficult with inks containing water soluble acid dyes or food dyes.

While known compositions and processes are suitable for their intended purposes, a need remains for improved ink compositions suitable for ink jet printing processes. In addition, a need remains for ink compositions with improved wet smear characteristics. Further, a need remains for ink compositions containing water-soluble dye colorants that exhibit improved wet smear characteristics.

Additionally, a need remains for ink compositions containing acid dye or food dye colorants that exhibit improved wet smear characteristics. There is also a need for ink compositions containing yellow acid dyes or food dyes that exhibit improved wet smear characteristics. In addition, there is a need for ink compositions containing Acid Yellow 23 dye that exhibit improved wet smear characteristics. Further, there is a need for ink compositions that exhibit improved soaking waterfastness characteristics.

SUMMARY OF THE INVENTION

The present invention is directed to an ink composition which comprises (1) water; (2) a colorant; and (3) an additive selected from the group consisting of monoalkylamido quaternary ammonium salts and mixtures thereof.

DETAILED DESCRIPTION OF THE INVENTION

Inks of the present invention contain an aqueous liquid vehicle, a colorant, and a monoalkylamido quaternary ammonium salt additive. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Ink compositions of the present invention also include a colorant. Dyes are suitable colorants for the inks of the present invention. Any suitable dye or mixture of dyes compatible with the ink liquid vehicle can be used, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No.1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175,183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No.1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Basic Yellow dyes (No. 17, 21, 51, and the like), Basic Red dyes (No. 1, 2, 5, 9, 29, and the like), Basic Blue dyes (No. 6, 7, 9, 11, 12, 16, 17, 24, 26, 41, 47, 66, and the like); anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, NY; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt—free" dyes available from Clariant Corp., Charlotte, NC, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Also suitable as a colorant are pigment particles. The pigment can be of any desired color, such as black, cyan, magenta, yellow, red, blue, green, brown, or the like, as well as mixtures thereof. Examples of suitable pigments include various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue2G (Pigment Blue 15:3), Hostafine® Black T (Pigment Black 7), and Hostafine® Black TS (Pigment Black 7), available from Clariant Corp., Charlotte, NC, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, NC), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Clariant Corp., Charlotte, NC), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, NC), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. The pigment particles can be of any desired size. Typical average particle diameters for pigment particles in inks to be used in thermal ink jet printing processes, for example, are from about 0.001 to about 10 microns, preferably from about 0.01 to about 3 microns, and more preferably less than about 1 micron, although the average particle diameter can be outside these ranges. The pigment particles can be present in the ink in any desired amount. Typically the pigment particles are present in an amount of from about 1 to about 20 percent by weight, preferably from about 1 to about 10 percent by weight, more preferably from about 2 to about 8 percent by weight, and even more preferably from about 4 to about 7 percent by weight, although the amount can be outside these ranges.

Mixtures of one or more dyes and/or one or more pigments can also be employed for the colorant component of the inks of the present invention.

The ink compositions of the present invention further contain a monoalkylamido quaternary ammonium salt additive. These salts include those of the general formula

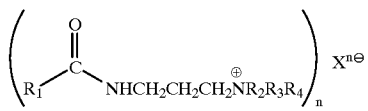

wherein $R_1$ is an alkyl group, including saturated, unsaturated, and substituted alkyl groups, preferably linear, although some branching is acceptable, and preferably with from about 12 to about 24 carbon atoms, more preferably with from about 14 to about 20 carbon atoms, and most preferably with from about 16 to about 18 carbon atoms, although the number of carbon atoms can be outside of these ranges, an arylalkyl group, preferably wherein the aryl portion is bonded to the nitrogen atom, including those wherein the alkyl portion is saturated, unsaturated, or substituted, said alkyl portion preferably being linear, although some branching is acceptable, said arylalkyl group preferably with from about 14 to about 26 carbon atoms, more preferably with from about 16 to about 22 carbon atoms, and most preferably with from about 18 to about 20 carbon atoms, although the number of carbon atoms can be outside of these ranges, and wherein the alkyl group or the alkyl portion of the arylalkyl group can be substituted with fluorine atoms (such as a perfluoroalkyl group), said perfluoro alkyl group preferably having at least about 8 carbon atoms more preferably with from about 8 to about 24 carbon atoms, even more preferably with from about 10 to about 20 carbon atoms, and most preferably with from about 12 to about 18 carbon atoms, and said aryl-perfluoroalkyl group preferably having at least about 10 carbon atoms, more preferably with from about 10 to about 26 carbon atoms, even more preferably with from about 12 to about 22 carbon atoms, and most preferably with from about 14 to about 20 carbon atoms, $R_2$, $R_3$, and $R_4$ each, independently of the others, is a hydrogen atom, an alkyl group, including saturated, unsaturated, and substituted alkyl groups, preferably with from 1 to about 2 carbon atoms, more preferably with from 1 to about 3 carbon atoms, and even more preferably with from 1 to about 4 carbon atoms, although the number of carbon atoms can be outside of these ranges, with examples of suitable substituted alkyl groups including hydroxymethyl, hydroxyethyl, hydroxypropyl, phenyl (resulting in a benzyl group, particularly preferred when the phenyl group is bound to the carbonyl carbon), and the like, and X is an anion, wherein n represents the charge on the anion, and typically is an integer of 1, 2, or 3, although the value of n can be outside of this range. Any desired or suitable anion can be employed; examples of suitable anions include Cl—, Br—, I—, $HSO_4$—, $HSO_3$—, $SO_4^{2-}$, $SO_3^{2-}$, $CH_2SO_3$—, $CH_3SO_3$—, $CH_3C_6H_4SO_3$—, $NO_3$—, HCOO—, $CH_3COO$—, $HCO_3$—, $CO_3^{2-}$, $H_2PO_4$—, $HPO_4^{2-}$, $PO_4^{3-}$, SCN—, $BF_4$—, $ClO_4$—, $SSO_3$—, and the like, as well as mixtures thereof. The monoalkylamido quaternary ammonium salt is present in the ink in any desired or effective amount, typically from about 0.1 to about 20 percent by weight of the ink, preferably from about 0.2 to about 10 percent by weight of the ink, and more preferably from about 0.5 to about 5 percent by weight of the ink, although the amount can be outside of these ranges. The monoalkylamido quaternary ammonium salt is generally added to the ink in an amount above the critical micelle concentration (CMC), and it is believed that cationic micelles are thereby formed. Monoalkylamido quaternary ammonium salts suitable for the inks of the present invention are commercially available from, for example, American Cyanamid, New Jersey, as CYASTAT LS (wherein $R_1$, is $C_{11}H_{23}$, $R_2$, $R_3$, and $R_4$ are $CH_3$, and X is $CH_3SO_4$), CYASTAT SP (wherein $R_1$ is $C_{17}H_{35}$, $R_2$ and $R_3$ are $CH_3$, $R_4$ is $CH_2CH_2OH$, and X is $H_2PO_4$), CYASTAT SN (wherein $R_1$ is $C_{17}H_{35}$, $R_2$ and $R_3$ are $CH_3$, $R_4$ is $CH_2CH_2OH$, and X is $NO_3$), and from Akzo Nobel, Chicago, Ill., as FOAM-QUAT BAS (wherein $R_1$ is $C_{12}H_{23}$, $R_2$ and $R_3$ are hydrogen atoms, $R_4$ is $CH_2CH_3$, and X is $CH_3CH_2SO_4$), FOAMQUAT CAS (wherein $R_1$ is coco, $R_2$ and $R_3$ are hydrogen atoms, $R_4$ is $CH_2CH_3$, and X is $CH_3CH_2SO_4$), FOAMQUAT COAS (wherein $R_1$ is cocoyl, $R_2$ and $R_3$ are hydrogen atoms, $R_4$ is $CH_2CH_3$, and X is $CH_3CH_2SO_4$), FOAMQUAT IAES (wherein $R_1$ is isostearyl, $R_2$ and $R_3$ are hydrogen atoms, $R_4$ is $CH_2CH_3$, and X is $CH_3CH_2SO_4$), FOAMQUAT SOAS (wherein $R_1$ is soya, $R_2$ and $R_3$ are hydrogen atoms, $R_4$ is $CH_2CH_3$, and X is $CH_3CH_2SO_4$), and the like.

In some instances, the monoalkylamido quaternary ammonium salt is present in combination with a cosurfactant to improve solubility of the salt in the ink. Examples of suitable cosurfactants include cationic monoquaternary ammonium salt surfactants, such as cationic coco methyl diethoxy quaternary ammonium salts, Ethoquad C/12, available from Akzo Nobel, Chicago, Ill., and the like. The cosurfactant is present in the ink in any desired or effective amount, typically from about 1 to about 5 percent by weight of the ink, although the amount can be outside of this range. Generally, the cosurfactant is added to the ink subsequent to addition of the monoalkylamido quaternary ammonium salt; the monoalkylamido quaternary ammonium salt can tend to precipitate the colorant in the ink, especially when the colorant is a dye, and the cosurfactant is added in an amount sufficient to resolubilize the monoalkylamido quaternary ammonium salt and the colorant, but not in excess of this amount, to avoid reducing waterfastness and to avoid undesirable reduction of surface tension.

While not being limited to any particular theory, it is believed that when anionic dyes are selected as the ink colorant, the anionic dye molecules are attracted to the cationic micelles, resulting in formation of a loose, charge-neutral association complex which comes out of solution. With the addition of more monoalkylamido quaternary ammonium salt, it is believed that this complex redissolves to result in super cationic micelles. The charge-neutral micelles form when each cationic end group extending from the micelle becomes associated with a dye molecule; the super cationic micelles form when the amount of micellar material significantly exceeds the amount of anionic dye, and some of the cationic end groups extending from the micelle are associated with dye molecules (which tend to be relatively firmly associated with the micelle) and some of the cationic end groups extending from the micelle are associated with counterions (which tend to move about freely without being firmly associated with the micelle). When jetted onto paper, the cationic micellar complexes are highly substantive to the paper surface. The hydrocarbon tails projecting from the paper surface also provide slip, thereby resulting in a reduction in wet smear. The monoalkylamido quaternary ammonium salts exhibit good binding to cellulosic surfaces, such as paper and many transparency coatings, both through the amide groups and through the quaternary groups.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

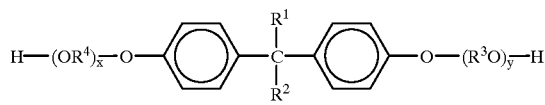

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325-373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside of this range, especially for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 7 to about 8, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. In a preferred embodiment, the ink ingredients are mixed in the following order: (1) water; (2) any salts present in the ink; (3) any cosolvents or humectants present in the ink; (4) polyquaternary compound; (5) dye. If the polyquaternary compound and the dye are added to water prior to addition of salts and/or cosolvents and/or humectants, a precipitated complex may form, which generally will tend to dissolve slowly to homogeneity subsequent to addition of the other ink ingredients.

The present invention is also directed to a process which entails incorporating an ink composition of the present invention into an ink jet printing apparatus and causing droplets of the ink composition to be ejected in an imagewise pattern onto a substrate. In one embodiment, the printing apparatus employs a thermal ink jet process wherein the ink in the nozzles is selectively heated in an imagewise pattern, thereby causing droplets of the ink to be ejected in imagewise pattern. In another embodiment, the printer employs an acoustic ink jet process, wherein droplets of the ink are caused to be ejected in imagewise pattern by acoustic beams. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

Control

A yellow ink composition was prepared by simple mixing of the following ingredients:

| Ingredient | Supplier | Amount (grams) |
| --- | --- | --- |
| PROJET YELLOW OAM (Acid Yellow 23) dye* | Zeneca Colors | 107.57 |
| DOWICIL 150/200 biocide | Dow Chemical Co. | 0.2 |
| polyethylene oxide** | Polysciences | 0.1 |
| imidazole | American Biorganics | 2 |
| ethylene diamine tetraacetic acid | Dow Chemical Co. | 0.13 |
| urea | Arcadian Corp. | 12 |
| sulfolane*** | Phillips Petroleum Co. | 30 |
| butyl carbitol | Van Waters & Rogers | 24 |
| deionized water | — | 24 |
| roll mill 30 minutes | | |

*aqueous solution containing 7.5 wt. % dye solids and 92.5 wt. % water
**bisphenol-A derivative, molecular weight 18,500, of the formula -continued

| Ingredient | Supplier | Amount (grams) |
| --- | --- | --- |

$$H-(OH_4C_2)_x-O-\phenyl-C(CH_3)_2-\phenyl-O-(C_2H_4O)_y-H$$

***containing 95 wt. % sulfolane and 5 wt. % water

The resulting ink was filtered through a 1.2 micron Memtec filter at 20 pounds per square inch. The resulting ink exhibited a viscosity of 3.66 centipoise at 25° C., a pH of 8.37 at 23° C., a surface tension of 36.7 dynes per centimeter, and a conductivity of 5.14 millimhos.

EXAMPLE

To three ink compositions prepared as described in the control were added 3 percent by weight of one of the following monoalkylamido quaternary ammonium salts: CYASTAT LS, CYASTAT SP, CYASTAT SN (all obtained from American Cyanamid, New Jersey), along with 7 percent by weight additional water. To three additional ink compositions prepared as described in the Control were added 6 percent by weight of one of the same monoalkylamido quaternary ammonium salts, along with 4 percent by weight additional water. For comparison purposes, another ink prepared as described in the Control was also diluted with water in an amount such that the resulting ink contained about 10 percent by weight of the added water. The resulting inks were hand coated onto XEROX® Image Series Smooth paper with a #7 Meyer rod. The water-diluted ink of the Control exhibited a waterfastness of about 40 percent (measured by determining the optical density of the image before and after soaking in water for 5 minutes) and a wet smear of about 0.23 (measured by passing a weighted (100 grams pressure) water saturated felt tip (similar to those found in marking pens) across the ink image, which transferred some of the dye outside of the original image area and onto the adjacent virgin paper, and measuring the optical density of the dye transferred onto the virgin paper). In contrast, the inks containing the monoalkylamido quaternary ammonium salts exhibited the following characteristics:

| Additive | Amount (wt. %) | Waterfastness | Wet Smear |
| --- | --- | --- | --- |
| Cyastat SN | 3 | 43 | 0.09 |
| Cyastat SN | 6 | 62 | 0.06 |
| Cyastat SP | 3 | 44 | 0.09 |
| Cyastat SP | 6 | 73 | 0.05 |
| Cyastat LS | 3 | 40 | 0.08 |
| Cyastat LS | 6 | 66 | 0.05 |
| control | — | 40 | 0.10 |

As the results indicate, the inks containing the additive exhibited improved wet smear characteristics, and those containing about 6 percent by weight of the additive exhibited particularly notable improvements in wet smear and waterfastness.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (1) water; (2) a colorant which is an anionic dye; and (3) an additive selected from the group consisting of monoalkylamido quaternary ammonium salts and mixtures thereof.

2. An ink composition according to claim 1 wherein the colorant is an Acid dye or a Food dye.

3. An ink composition according to claim 1 wherein the colorant is a yellow dye.

4. An ink composition according to claim 1 wherein the colorant is Acid Yellow 23 dye.

5. An ink composition according to claim 1 wherein the monoalkylamido quaternary ammonium salt is of the formula

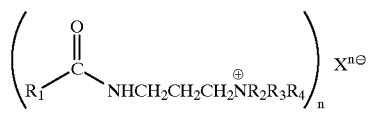

wherein $R_1$ is an alkyl group, an arylalkyl group, a perfluoroalkyl group, or an arylperfluoroalkyl group, $R_2$, $R_3$, and $R_4$ each, independently of the others, is a hydrogen atom, an alkyl group, X is an anion, and n is an integer representing the charge on the anion.

6. An ink composition according to claim 5 wherein the alkyl groups have from about 12 to about 24 carbon atoms, the arylalkyl groups have from about 14 to about 26 carbon atoms, the perfluoroalkyl groups have from about 8 to about 24 carbon atoms, and the arylperfluoroalkyl groups have from about 10 to about 26 carbon atoms.

7. An ink composition according to claim 5 wherein the alkyl groups have from about 14 to about 20 carbon atoms, the arylalkyl groups have from about 16 to about 22 carbon atoms, the perfluoroalkyl groups have from about 10 to about 20 carbon atoms, and the arylperfluoroalkyl groups have from about 12 to about 22 carbon atoms.

8. An ink composition according to claim 5 wherein the alkyl groups have from about 16 to about 18 carbon atoms, the arylalkyl groups have from about 18 to about 20 carbon atoms, the perfluoroalkyl groups have from about 12 to about 18 carbon atoms, and the arylperfluoroalkyl groups have from about 14 to about 20 carbon atoms.

9. An ink composition according to claim 1 wherein the monoalkylamido quaternary ammonium salt is present in the ink in an amount of from about 0.1 to about 20 percent by weight.

10. An ink composition according to claim 1 wherein the monoalkylamido quaternary ammonium salt is present in the ink in an amount of from about 0.2 to about 10 percent by weight.

11. An ink composition according to claim 1 wherein the monoalkylamido quaternary ammonium salt is present in the ink in an amount of from about 0.5 to about 5 percent by weight.

12. An ink composition according to claim 1 wherein the monoalkylamido quaternary ammonium salt is present in the ink in an amount greater than the critical micelle concentration.

13. An ink composition according to claim 1 further containing a cosurfactant.

14. An ink composition according to claim 13 wherein the cosurfactant is a cationic monoquaternary ammonium salt.

15. An ink composition prepared by admixing (1) water; (2) an anionic dye; and (3) an additive selected from the group consisting of monoalkylamido quaternary ammonium salts and mixtures thereof.

16. A process which comprises (i) incorporating into an ink jet printing apparatus an ink composition according to claim 1; and (ii) causing droplets of the ink composition to be ejected in an imagewise pattern onto a substrate.

17. A process according to claim 16 wherein the printing apparatus employs a thermal ink jet process wherein the ink in the nozzles is selectively heated in an imagewise pattern, thereby causing droplets of the ink to be ejected in imagewise pattern.

18. A process for reducing wet smear in images subsequent to printing of the images on a substrate which comprises (a) providing an ink composition according to claim 1; (b) incorporating the ink into an ink jet printer; and (c) causing droplets of the ink to be ejected in an imagewise pattern.

19. A process which comprises (i) incorporating into an ink jet printing apparatus an ink composition which comprises (1) water; (2) a colorant; and (3) an additive selected from the group consisting of monoalkylamido quaternary ammonium salts and mixtures thereof; and (ii) causing droplets of the ink composition to be ejected in an imagewise pattern onto a substrate, wherein the printing apparatus employs an acoustic ink jet process wherein droplets of the ink are caused to be ejected in imagewise pattern by acoustic beams.

* * * * *